United States Patent [19]

Gallazzini

[11] Patent Number: 5,524,425
[45] Date of Patent: Jun. 11, 1996

[54] DETHATCHING MACHINE

[76] Inventor: Silvio Gallazzini, 25 Mann Ave., Staten Island, N.Y. 10314

[21] Appl. No.: 159,791

[22] Filed: Nov. 30, 1993

[51] Int. Cl.[6] .................................................. A01D 43/02
[52] U.S. Cl. ............................................ 56/364; 56/400.2
[58] Field of Search ............................. 56/14.8, 16.4 R, 56/16.7, 130, 164, 193, 364, 365, 367, 400.02, 400.2, 320.1, DIG. 12; 172/12.4, 12.5, 27, 28, 540, 611

[56] References Cited

U.S. PATENT DOCUMENTS

| | | |
|---|---|---|
| 678,461 | 7/1901 | Egan . |
| 3,962,854 | 6/1976 | van der Lely et al. ............ 56/370 |
| 4,344,273 | 8/1982 | Jobling et al. .................... 56/16.7 |
| 4,467,591 | 8/1984 | Dynie .............................. 56/16.4 |
| 4,489,539 | 12/1984 | Fralish ............................. 56/400 |

Primary Examiner—Ramon S. Britts
Assistant Examiner—Pamela A. O'Connor

[57] ABSTRACT

The invention relates to a dethatching machine having an improved rotating shaft mechanism. The shaft mechanism is provided with a plurality if engaging tines to engage and remove unwanted thatch. The shaft is also provided with added weight located at the periphery of the shaft mechanism so as to provide improved kinematic condition for the shaft.

4 Claims, 5 Drawing Sheets

DETHATCHING MACHINE

FIELD OF THE INVENTION

This invention relates to lawn dethatching machines, more particularly, to dethatching machines having a rotating shaft and spring like members or tines extending therefrom, which engage and remove undesirable thatch located in a lawn.

BACKGROUND OF THE INVENTION

Rotary lawn sweepers and lawn rakes are well known in the prior art. These sweepers and rakes typically remove undesirable elements from the lawn by having protruding members engage the lawn at some level above the ground or dirt which supports the grass.

These sweepers and rakes are typically inexpensive to manufacture, and are relatively simple to use by the amateur gardener. While such sweepers and rakes are suitable for keeping the lawn free of loose debris, the protruding members typically do not extend far enough into the lawn to remove the coarse undergrowth known as thatch, which inhibits the growth of desirable grass.

Although thatch removers have also been previously known in the prior art which operate to remove undesirable thatch and thereby promote growth of desirable grass, such devices also sometimes referred to as lawn scarifiers, such thatch removal devices typically employ the use of a motor to either rotate the assembly which contains the lawn engaging members or to propel or drag the entire device along the lawn. The expense associated with the use of such motive means makes such devices relatively expensive for the amateur gardener interested in maintaining his lawn. Other available thatch removal devices which do not employ electro-mechanical means are often cumbersome to propel and maneuver by hand. Thus, although the benefits of dethatching machines are well known and employed by professional gardeners, the devices are either too expensive or too cumbersome for the amateur gardener.

SUMMARY OF THE INVENTION

Accordingly, it is the object of the present invention to provide for an inexpensive, easy to manufacture, hand propelled dethatching machine, which is easy to operate, and which employs the use of a rotating shaft mechanism in combination with a plurality of tines, or tine like elements, to engage and remove unwanted thatch.

It is a further object of the invention to provide a shaft assembly for use in a dethatching machine which may be easily hand propelled such that it follows the contour of the ground without unwanted planar gouging of the ground beneath the shaft assembly.

These and other objects of the invention are attained by providing a shaft assembly which can be used in conjunction with a base assembly, a handle connected to the base assembly. The shaft mechanism is mounted within the base assembly so that the shaft mechanism rotates within the base assembly which may be hand propelled with the handle connected to the base assembly. The shaft mechanism is comprised of a center axle, with several support plates affixed along the axle and a means for adding weight to the periphery of the shaft mechanism. The plates support several rods helically around the axle, with each rod supporting a tine assembly, comprised of a plurality of tines mounted on each rod, with the tines radiating out from the rod and symmetrically separated by a plurality of spacers.

A special advantage of the present invention is that the addition of a means for adding weight at the periphery of the shaft mechanism provides for more favorable kinematic conditions, with a resulting increase in momentum to the rotation of the shaft assembly. Accordingly, the machine is more favorable to manual operation, eliminating the necessity of more expensive motors to rotate the shaft mechanism.

BRIEF DESCRIPTION OF THE DRAWINGS

Further objects and advantages of the invention will be apparent from a reading of the following description in conjunction with the accompanying drawings, in which.

DESCRIPTION OF THE PREFERRED EMBODIMENT

Figure 1:
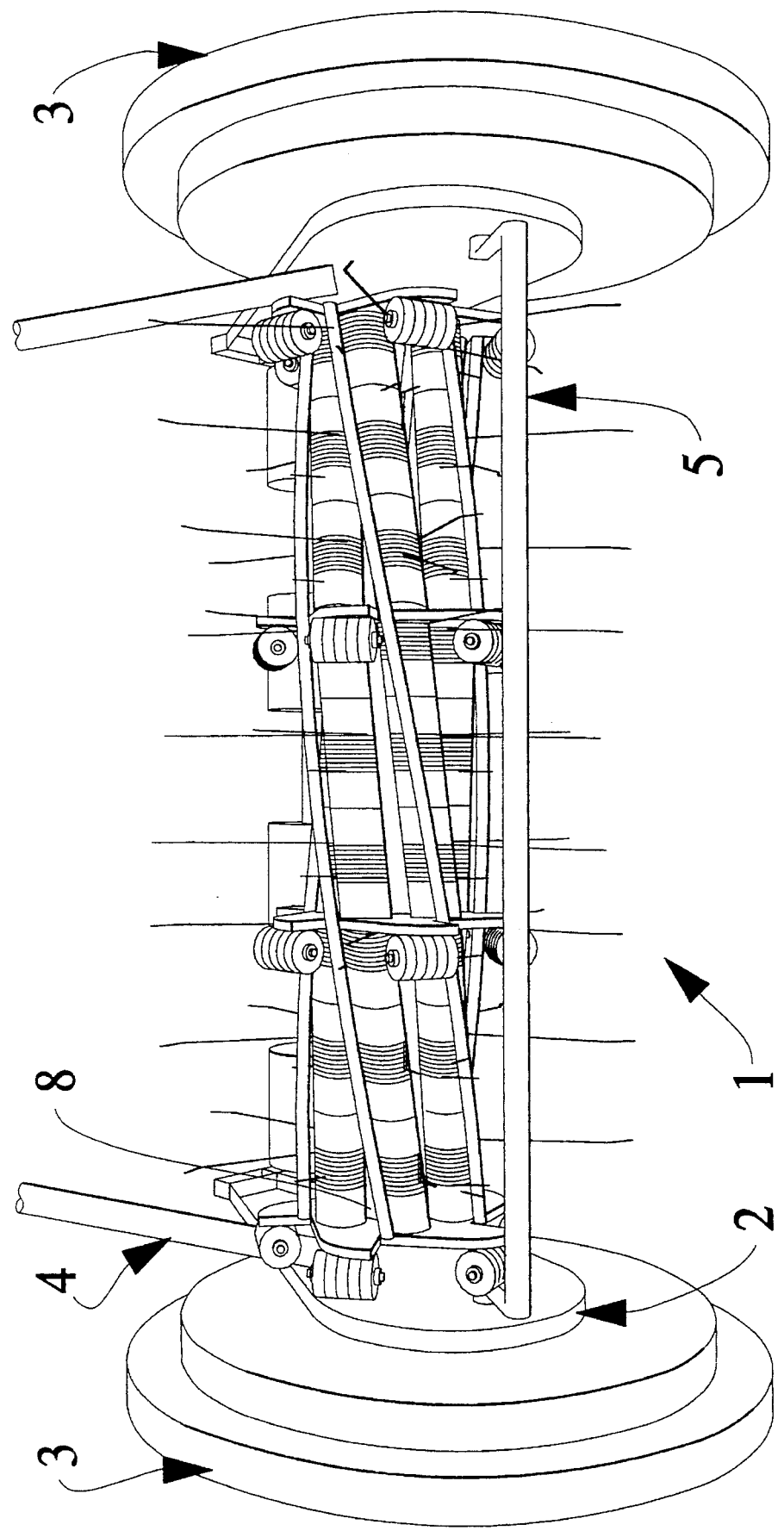
FIG. 1 is a perspective view of a preferred embodiment of a dethatching machine of the present invention with a handle partly removed.

With continued reference to the drawings, where common components are provided with common numbers, the present invention is embodied in a dethatching machine having a shaft assembly with a plurality of extending tine like elements which engage the thatch in the ground and a weighted periphery for aiding in the rotation of the shaft mechanism which is located within a base assembly of the dethatching machine. Illustrated in the drawings is one preferred embodiment of the present invention. The preferred embodiment is provided to better illustrate the present invention and there are many possible modifications which could be made to the illustrated example which, taken in conjunction with the disclosure provided herein, would be obvious to one of ordinary skill in the art without straying from the present invention. Thus, the present invention should not be limited to the particular embodiment illustrated below.

Figure 3:
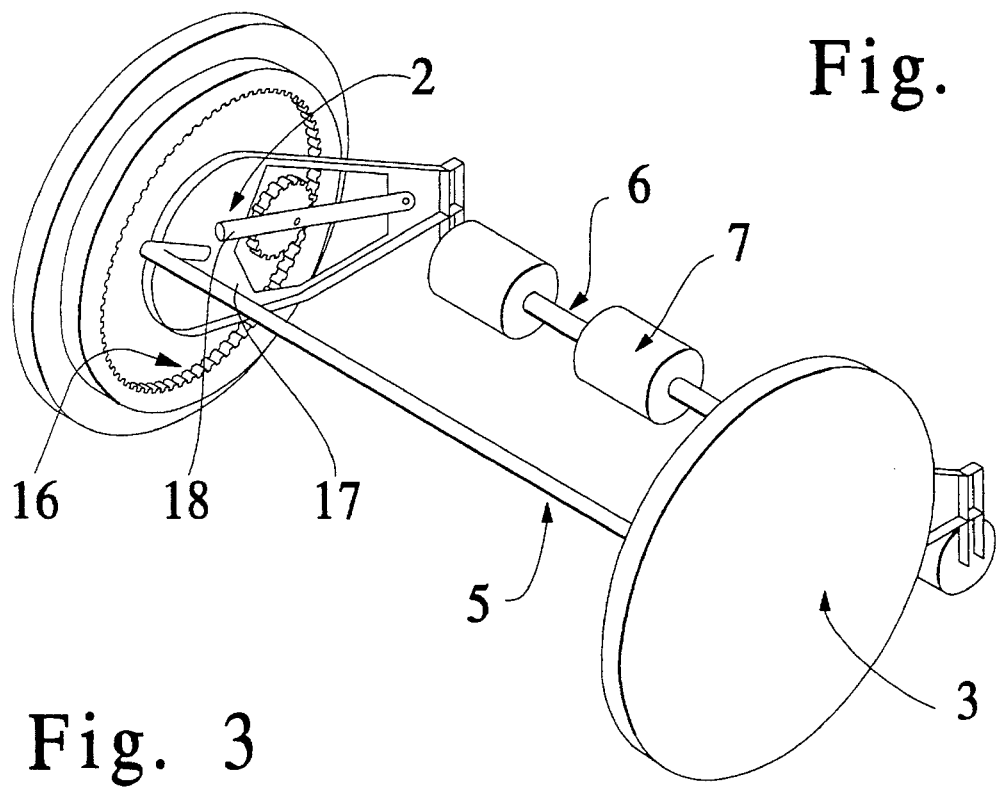
FIG. 3 is a perspective view of the dethatching machine shown in FIG. 1 with the handle and shaft mechanism removed.

A preferred embodiment of the invention is shown in FIG. 1 wherein a lawn dethatching machine 1 has a base assembly which is shown in more detail in FIG. 3. The base assembly includes ground engaging wheels 3 which are rotatably affixed to lateral plates 2 which are in turn connected at their trailing edge by a rigid trailing bar 6. The lateral plates 2 are held in the same plane relative to each other by the trailing bar 6 and the guard 5. The trailing bar 6 supports one or more rollers 7, which rotate about the trailing bar 6 as the dethatching machine 1 is pushed by its handle 4 along the ground. The guard 5 is affixed to the leading edge of the lateral plates 2 to protect the shaft assembly from possible obstructions along the ground.

Figure 4:
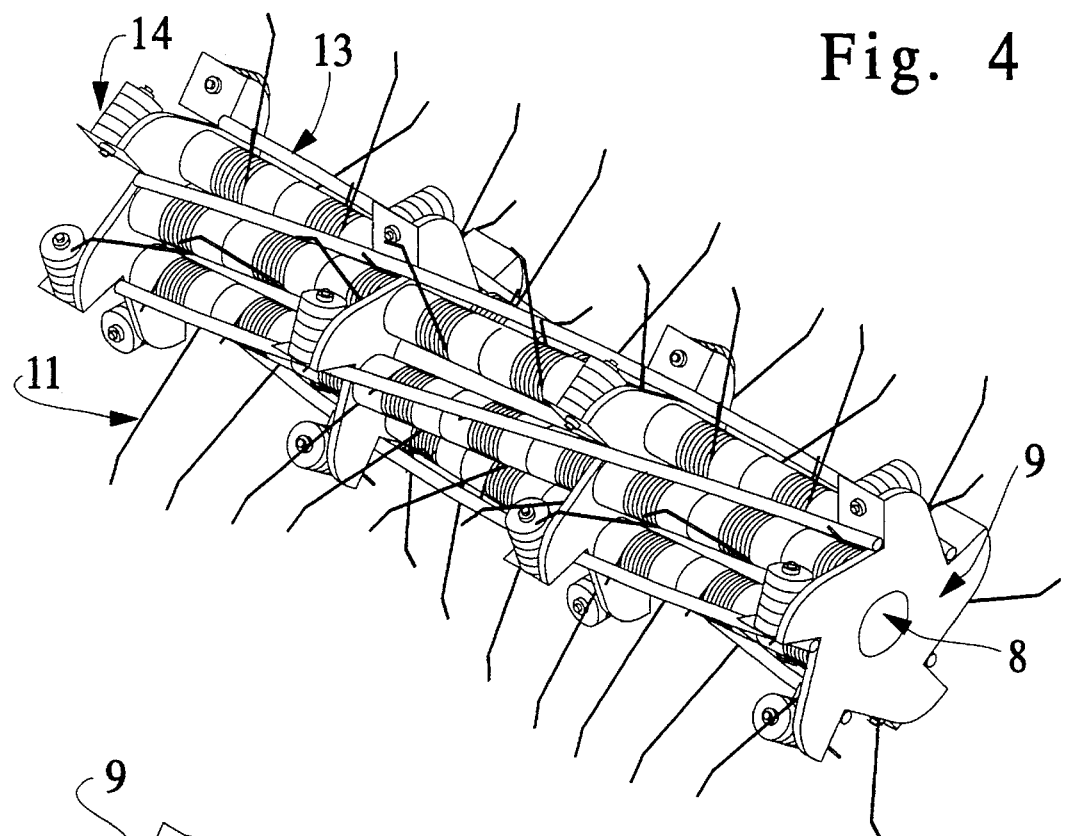
FIG. 4 is a perspective view of the shaft assembly shown in FIG. 1.
Figure 5:
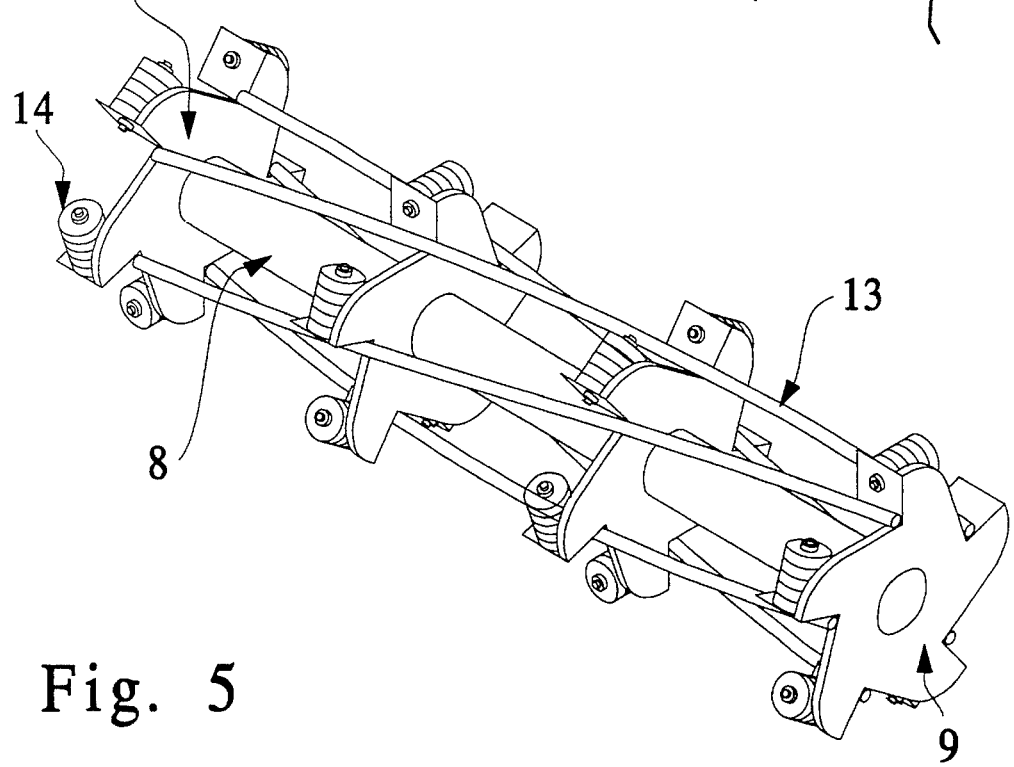
FIG. 5 is a perspective view of the shaft assembly shown in FIG. 1 with the tine assembly removed.
Figure 6:
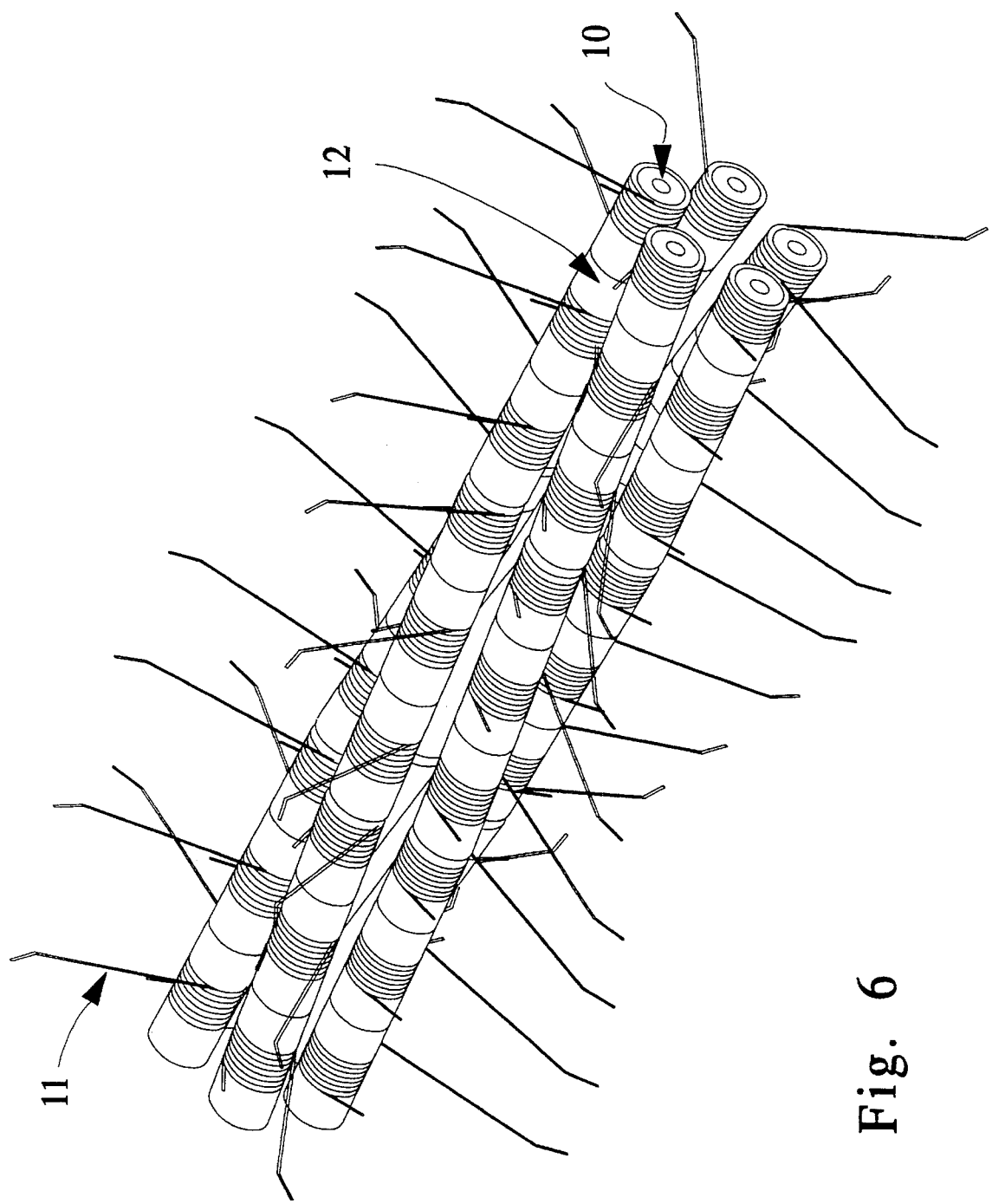
FIG. 6 is a perspective view of the tine assembly as mounted on the rods shown in FIG. 1.
Figure 7:
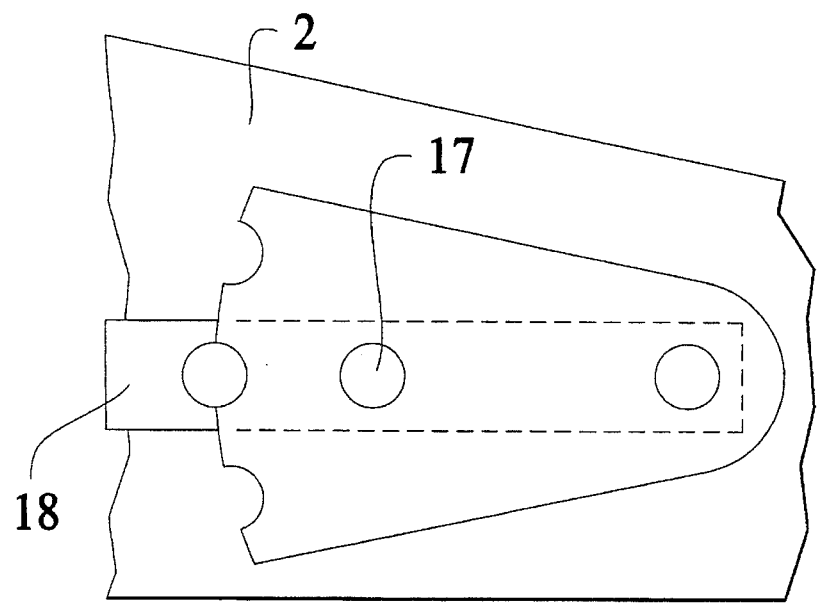
FIG. 7 is an expanded view of the bearing means shown in FIG. 3.
Figure 8:
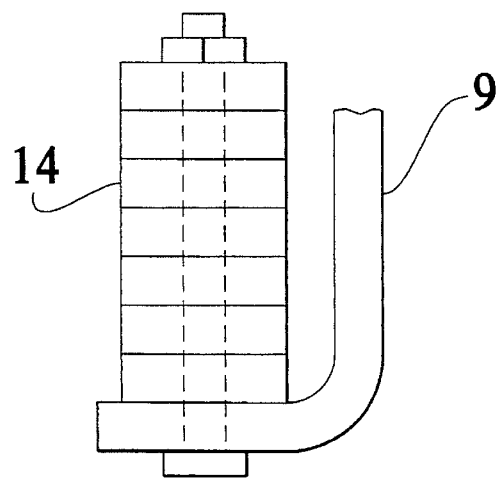
FIG. 8 is an expanded view of the peripheral weight mechanism shown in FIG. 4.

Shown in FIG. 4, a shaft mechanism is provided which rotates within the base assembly around the center line of a shaft 8. The shaft 8 extends at both its ends through the lateral plates 2 and is supported on bearings. The shaft 8 is coupled at each end either to the wheels 3 or to a suitable drive means which may employ the use of gears. The shaft mechanism is rotated by means of ground engaging wheels with integral gears. The shaft mechanism is fitted with gears and pinions that provide one way clutching and mesh with the integral gears on the wheels. Several support plates 9 having a hole through their center so that the axle 8 passes through said hole are rigidly affixed along the length of the axle 8.

Figure 2:
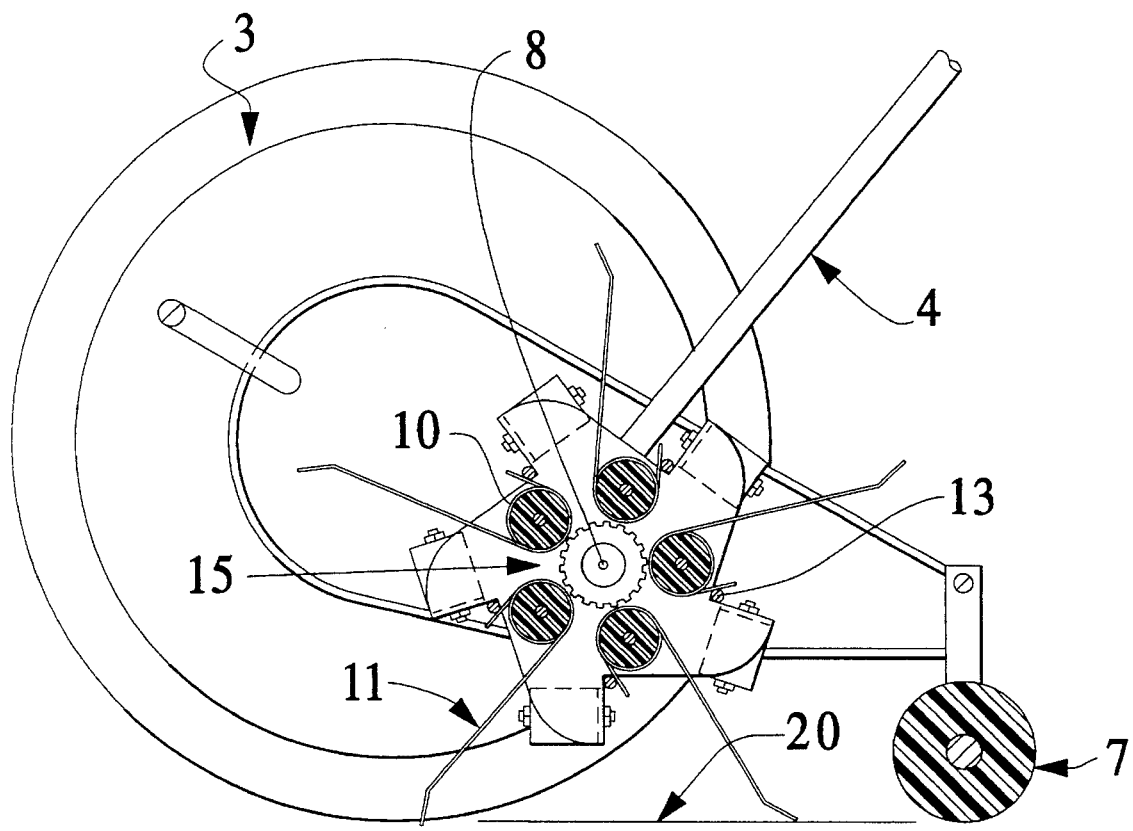
FIG. 2 is a side elevational view taken at a cross section of the dethatching machine shown in FIG. 1.

The axle 8 may be connected by any number of ways to the wheels for the purpose of receiving rotational power. Shown in FIGS. 2 and 3 is one preferred example of a gearing system which may be employed by the present invention. In FIG. 2, the axle 8 is provided with a gear portion 15 which extends through a bearing mechanism 17 in the lateral plates to the wheel gear portion 16 of the wheel 3 shown in FIG. 3. The shaft mechanism is held in a fixed position relative to the ground by the lateral plates 2 with a bearing mechanism 17. Many possible variations to this system are possible. For instance, if the rotation of the axle is to be reversed the axle gear 15 of the shaft assembly could be moved to engage a gear which is on the outside of the gear portion 16 of the wheel, or in the alternative, to engage an inside center gear on the wheel. These variations would be obvious to those skilled in the art when viewed in conjunction with the disclosure provided herein.

The tine assembly is mounted between in the support plates 9. The tines 11 are fastened to the rotating shaft mechanism with threaded rods 10. The threaded rods are secured through holes in the supporting plates 9. The supporting plates 9 are staggered to provide for helical tine placement. The rods 10 can be easily removed and installed to provide for easy tine 11 replacement.

The rods are provided with rubber bushings, such as a suitable rubber hose piece, which loosely goes around the threaded rod and which serves to receive the tortional portion of the tine 11. The individual tines 11 are placed on the bushing and are separated by hollow spacers 12. The number of tines 11 and corresponding spacers 12 may vary, depending upon the desired degree of engagement between tines 11 and the ground.

Although the tines 11 are shown in helical arrangement, the tines may also be positioned in any number of other arrangements. For instance, the tines may be arranged in a chevron, double reversed helix, and cylindrical drum reel arrangements to name a few.

As more readily evident in FIG. 2, the ground engaging end of a tine 11 is pushed up against the ground surface 20 as the shaft assembly rotates. The other end of the tine 11 is then correspondingly pushed up against a retaining bar 13, which then forces tension on the tine 11 as it travels along the ground, removing unwanted thatch. The retaining bar 13 is rigidly affixed to a notch on each of the support plates 9. In the preferred embodiment shown in the drawings, the tine assembly and retaining bars 13 are positioned helically around the axle 8 to provide a consistent resisting torque to rotation.

With the hand propelled dethatching mechanism 1 the shaft mechanism may be propelled by any one of a number of well known gear and pinion mechanism. In one example, the drive mechanism is provided with a unidirectional bearing and gear mechanism 15. The gear rotates only in one direction and spins freely when the wheels rotate in the reverse. The gears 15 in the shaft mechanism shown in FIG. 2 are powered by gears 16 on inside portion of the wheels as shown in FIG. 3. The shaft mechanism may also be provided with a means 18 for raising the tines 11 relative to the ground surface 20. Alternatively, the rollers 7 may also be moved up and down relative to the support arms of the lateral plates 2 and pivotally move the lateral plates and the shaft mechanism attached thereto to move the tines 11 relative to the ground level and thereby provide varying degrees of tine 11 penetration. Such mechanisms for gearing and raising the height of the tines are well known in the art and shall not be discussed further herein.

The tines 11 may be arranged in the shaft mechanism in any number of ways as long as the tines are spaced sufficiently apart as to provide repetitive engagement with the ground in a staggered manner so as to minimize the frictional contact with the ground and thereby make manual operation possible. In addition to the tines 11, a plurality of weights 14 are affixed to the periphery of the support plates 9. The weights 14 contribute to greater rotational inertia for the shaft mechanism, permitting easier manual operation of the dethatching machine when pushing the dethatching machine through tall grass or thick thatch. It is readily evident that other methods may be employed to add weight to the periphery of the shaft mechanism, such as the use of heavier retaining bars 13 or manufacturing the support plates 9 such that there is greater mass at their periphery.

As shown in the drawings, the preferred embodiment described herein employs a two wheel system having the shaft mechanism in close proximity thereto. This arrangement provides a consistent and accurate movement of the shaft mechanism relative to the ground. Many four wheel systems which employ motors for rotating the shaft mechanism do not follow the ground and will either dig out or scalp a portion of the ground that extends above the portion of the ground which is engaged by the wheels of the system or it will damage the tines which will come under sever stress as a result of the close engagement with the ground. The two wheel system of the preferred embodiment illustrated in the drawings may require some modification of the handle connection relative to the wheel base. Depending on the size of the wheels and the gearing used between the wheels and the shaft mechanism, the handle may need to be moved further back relative to the wheel base. Moving the handle further behind the wheel base will provide additional force behind the wheel base and thereby make sure that the shaft mechanism will not tip up above the ground when the machine is being pushed.

The shaft assembly described herein may also be used in conjunction with a tractor wherein a shaft assembly of appropriate size is connected behind the tractor and is dragged along to provide a dethatching operation. The shaft mechanism would be sized as appropriate in such cases but the shaft mechanism of the present invention would retain the same design features. Such a modification would be simple and obvious to one skilled in the art.

Manual propulsion of the dethatching machine would provide obvious inherent safety benefits to the ordinary consumer. Specifically, the machine would be less noisy than a motorized vehicle and it would provide no emissions which would be harmful to the environment.

In another alternative preferred embodiment of the present invention, the dethatching machine would also be provided with a catching unit. However, in certain thick terrain, such a unit would be inefficient because it would require frequent emptying.

Although the invention has been described herein with reference to a specific preferred embodiment, many modifications and variations of the invention will readily occur to those skilled in the art. For instance, although only one preferred arrangement of the tines 11 is provided, many possible configurations could be used. In addition, tines 11 could be replaced with other spring action elements which extend from the shaft mechanism and which engage the ground. The connecting mechanism between the wheels and the shaft mechanism could also be modified in any number of ways so as to provide direct and indirect coupling and with or without gearing so as to adjust the rotational speed of the shaft mechanism relative to the wheel motion. Accordingly, all such variations and modifications are included within the intended scope of this invention.

I claim:

1. A hand propelled lawn dethatching machine comprising:

a base assembly;

a handle connected to the base assembly;

a shaft mechanism rotatably mounted within the base assembly, the shaft mechanism comprising a center axle, a plurality of support plates affixed along the axle and a plurality of weights affixed to the support plates, the plates supporting a plurality of rods helically mounted around the axle, each rod of said rods having a plurality of tines mounted thereon, with the tines radiating out from the rod and symmetrically separated by a plurality of spacers.

2. An improved shaft mechanism for use in a hand propelled dethatching machine having a rotating force mechanism for generating rotational force to turn the improved shaft mechanism, said improved shaft mechanism comprising:

an axially extending center portion of said shaft mechanism having a center shaft, a plurality of spaced apart support plates having a plurality of guide grooves connected to the center shaft, each of said support plates having a portion extending from the center shaft to the periphery of the shaft mechanism;

a plurality of tines including a base portion and an end engagement portion, coupled to the axially extending center portion, said plurality of tines extending from said center portion to a distance beyond a peripheral point in the shaft mechanism;

a plurality of rods coupled between said spaced apart support plates for receiving said base portion of said plurality of tines such as to form a tine formation around the shaft mechanism arranged such that the plurality tines will not simultaneously engage the ground when the shaft mechanism is inserted in a dethatching mechanism;

a plurality of tine engagement bars coupled to said grooves of said spaced apart support plates for receiving the end engagement portion of said plurality of tines so that the tines remain in a fixed position relative to said rods;

a peripheral weight mechanism located at the peripheral point in the shaft mechanism for aiding in the rotational movement of the shaft assembly, said peripheral weight mechanism comprising a plurality of weights coupled to the peripheral portion of the spaced apart support plates on the center shaft; and a rotational coupling device coupled to the axially extending center portion of the shaft for engaging the rotating force mechanism of the dethatching device, wherein said peripheral weight mechanism provides improved rotational movement of the shaft mechanism.

3. The improved mechanism of claim 2 wherein said mechanism is further coupled to a height adjustment means.

4. The improved shaft mechanism of claim 2, wherein the plurality of rods are further provided with a bearing for receiving the plurality of tines arranged thereon.

* * * * *